United States Patent
Gonsowski et al.

(10) Patent No.: US 10,476,138 B2
(45) Date of Patent: Nov. 12, 2019

(54) CELLULAR RADIO SHROUD

(71) Applicants: Gregory Gonsowski, Gainesville, GA (US); Kevin Garland, Gainesville, GA (US); Josef Faig, Cumming, GA (US)

(72) Inventors: Gregory Gonsowski, Gainesville, GA (US); Kevin Garland, Gainesville, GA (US); Josef Faig, Cumming, GA (US)

( * ) Notice: Subject to any disclaimer, the term of this patent is extended or adjusted under 35 U.S.C. 154(b) by 232 days.

(21) Appl. No.: 15/787,074

(22) Filed: Oct. 18, 2017

(65) Prior Publication Data
US 2018/0108978 A1    Apr. 19, 2018

Related U.S. Application Data

(60) Provisional application No. 62/409,507, filed on Oct. 18, 2016.

(51) Int. Cl.
| H01Q 1/02 | (2006.01) |
| H01Q 1/12 | (2006.01) |
| H01Q 5/30 | (2015.01) |
| H01Q 1/24 | (2006.01) |
| H04B 1/40 | (2015.01) |

(52) U.S. Cl.
CPC .............. H01Q 1/246 (2013.01); H01Q 1/02 (2013.01); H01Q 1/1228 (2013.01); H01Q 5/30 (2015.01); H04B 1/40 (2013.01)

(58) Field of Classification Search
None
See application file for complete search history.

(56) References Cited

U.S. PATENT DOCUMENTS

2004/0231875 A1* 11/2004 Rasmussen ............. G06F 1/189
174/50

* cited by examiner

Primary Examiner — Dimary S Lopez Cruz
(74) Attorney, Agent, or Firm — Thomas | Horstemeyer, LLP

(57) ABSTRACT

A shroud for a small cell antenna system is designed to house cellular telephone equipment, including a plurality of transceivers, RF conditioning equipment, and a network interface, which includes an interface to a optical fiber network. The housing has walls that define an interior region. The housing has at least one movable door that can be opened and closed to respectively permit and prevent access to the interior region. A generally planar backbone is situated in the interior region. The backbone has a plurality of apertures. A plurality of elongated brackets can be mounted to the backbone. Each bracket has a plurality of hooks and is attached to the backbone by insertion of the hooks into the apertures of the backbone. RF conditioning equipment (e.g., diplexer, triplexer, multiplexer, etc.) is mounted on one of the brackets within the housing. A network interface is mounted on another one of the brackets within the housing. Furthermore, one or more transceivers are mounted on one or more other brackets within the housing. The transceivers can be of different types, if desired.

16 Claims, 18 Drawing Sheets

CELLULAR RADIO SHROUD

CLAIM OF PRIORITY

This application claims priority to and the benefit of provisional application No. 62/409,507, filed Oct. 18, 2016, which is incorporated herein by reference in its entirety.

FIELD OF THE INVENTION

The present invention generally relates to housings for radio transceivers, and more particularly, to housings for colocation of cellular transceivers associated with different small cell antenna systems.

BACKGROUND OF THE INVENTION

Telephone companies have been installing small cell antenna systems, or "small cells," to increase geographical cell network coverage. Small cells are generally low-powered cellular radio access nodes that operate in the licensed and unlicensed spectrum that have a range of 10 meters to a few kilometers. These companies have been installing the small cells on existing electrical power poles (wood or metal), particularly poles that are situated in cities, as they do not need to pay rent as would be the case with other placements of such antennas at commercial establishments.

Each small cell antenna system generally includes a cellular radio (or transceiver), radio frequency (RF) conditioning equipment (e.g., diplexer, triplexer, multiplexer, etc.), a network interface, and an antenna, all of which are commercially available devices. The antenna is located at or near the top of the pole. The radio, RF conditioning equipment, and network interface are situated in a shroud below the antenna. A coaxial cable connects the antenna to the RF conditioning equipment, which in turn, is connected to the radio. The RF conditioning equipment multiplexes, demultiplexes, and filters signals at different disjoint frequencies or frequency bands so that multiple frequency channels pertaining to a plurality of radios can be used with the single antenna. The network interface essentially interfaces the radio with a network associated with a carrier. For instance, the network interface could be an optical fiber associated with a fiber optic network.

Currently, the shrouds house up to two radios, but they must be of the same type. Better designs for shrouds are needed.

SUMMARY OF INVENTION

The present disclosure provides various embodiments of a shroud that is mounted to a power line pole and that is designed to house a plurality of different cellular transceivers associated with different cellular networks and companies.

One embodiment, among others, is a shroud for housing cellular telephone equipment, which includes a housing. The housing has walls that define an interior region. The housing has at least one movable door that can be opened and closed to respectively permit and prevent access to the interior region. A generally planar backbone is situated in the interior region. The backbone has a plurality of apertures. A plurality of elongated brackets can be mounted to the backbone. Each bracket has a plurality of hooks and is attached to the backbone by insertion of the hooks into the apertures of the backbone. RF conditioning equipment is mounted on one of the brackets within the housing. A network interface is mounted on another one of the brackets within the housing. Furthermore, one or more transceivers are mounted on one or more other brackets within the housing. The transceivers can be of different types, if desired.

Another embodiment, among others, is a shroud for housing cellular telephone equipment. The shroud has a housing. The housing has walls that define an interior region. The housing has at least one movable door that can be opened and closed to respectively permit and prevent access to the interior region. A generally planar backbone is situated in the interior region. The backbone has a plurality of apertures. Furthermore, there are a plurality of elongated brackets. Each bracket has a longitudinal body between a first end and a second end. Each bracket is attached to the backbone at the first end by insertion into one of the apertures. Each longitudinal body has a means for attaching a cellular transceiver.

Another embodiment, among others, is a shroud for housing cellular telephone equipment. The shroud has a housing. The housing has walls that define an interior region, the housing having a door that can be opened and closed to respectively permit and prevent access to the interior region. The shroud has a means for mounting a first cellular transceiver within the interior region of the housing, and a means for mounting a second cellular transceiver within the interior region of the housing. The first and second cellular transceivers are different in that each operates over a different cellular network. Furthermore, the means for mounting the first and second cellular transceivers comprises a generally planar backbone situated in the interior region with a plurality of apertures. The means for mounting further includes one or more elongated brackets. Each bracket has a longitudinal body between an attached end and an unattached free end. The attached end has a plurality of hooks. Each bracket is attached to the backbone at the attached end by insertion of the hooks into the apertures of the backbone. Each longitudinal body has a means for attaching a cellular transceiver.

Another embodiment, among others, is a shroud for housing cellular telephone equipment. The shroud has a housing. The housing has walls that define an interior region, the housing having a door that can be opened and closed to respectively permit and prevent access to the interior region. The shroud has a means for mounting a first cellular transceiver within the interior region of the housing, and a means for mounting a second cellular transceiver within the interior region of the housing. The first and second cellular transceivers are different in that each operates over a different cellular network. Furthermore, the housing has a rear structure, a top panel, a bottom panel, and left and right side doors attached via respective hinges to the rear structure and that open and close in an opposing sideway direction to open and close the housing.

Another embodiment, among others, is a shroud for housing cellular telephone equipment. The shroud has a housing. The housing has walls that define an interior region, the housing having a door that can be opened and closed to respectively permit and prevent access to the interior region. The shroud has a means for mounting a first cellular transceiver within the interior region of the housing, and a means for mounting a second cellular transceiver within the interior region of the housing. The first and second cellular transceivers are different in that each operates over a different cellular network. Furthermore, a slide rail is mounted to the first transceiver and a power supply for the first transceiver is mounted to the slide rail and capable of being moved outwardly and inwardly on the slide rail to enable access to the power supply.

Other embodiments, systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT OF THE INVENTION

As illustrated in FIGS. 1 through 10, a shroud 20 is designed for housing cellular telephone equipment, including a plurality of radios, a network interface, and RF conditioning equipment. The shroud 20 can be attached to an electrical power pole 21, as shown in the FIGS. 1 through 10, mounted to a support at its underside, or otherwise mounted. The housing of the shroud 20 has walls with one or more doors 22 in order to enable access to the equipment.

Figure 11:
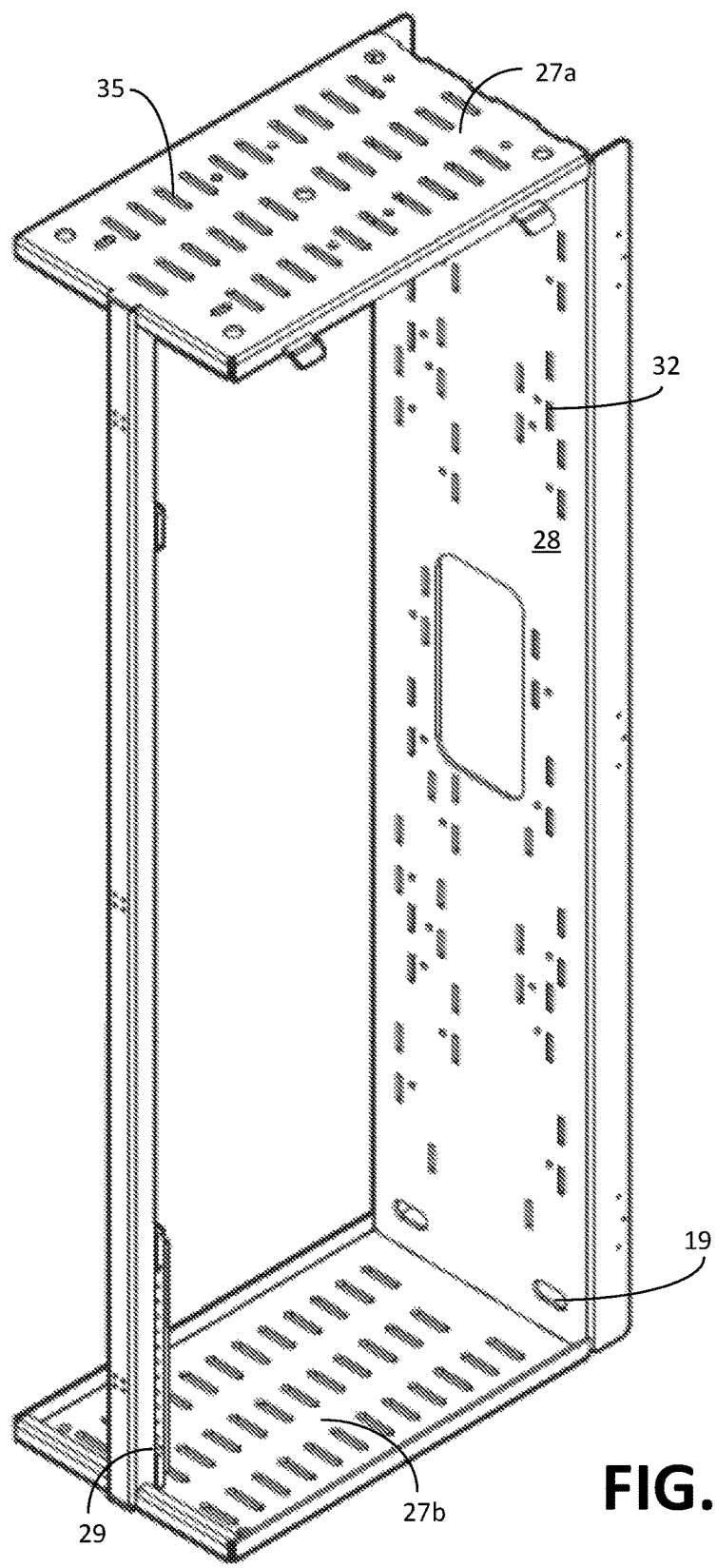
FIG. 11 is a right perspective view of the main body of the shroud to which the doors hingedly attach, showing a top, a bottom, the backbone in the rear, and door jamb separator in the front.

In the preferred embodiment, the housing of the shroud 20 has two doors 22*a*, 22*b*, which open sideways, or in a horizontal direction. The doors 22*a*, 22*b* are attached via hinges 23 to a rear structure 25, which is in turn attached with screws (or bolts) to electrical power pole 21 through holes 19 (FIG. 11) in the rear structure 25. The rear structure 25 in this embodiment has a curvature matching that of the power pole 21. This can be eliminated in stand-alone versions that are not mounted to a power pole 21. A suitable latch can be used to further secure the doors 22*a*, 22*b*.

The housing further includes rectangular, generally planar, top and bottom panels 27*a*, 27*b* attached to the rear structure 25 at a first end and attached to a vertical door jamb 29 at a second end. The interior region of the housing, which is defined by the doors 22*a*, 22*b*, the rear structure 25, the top panel 27*a*, the bottom panel 27*b*, and the door jamb 28, has a sufficient size and shape to contain a plurality of cellular transceivers 24. In the embodiment shown in the figures, there are three different commercially available transceivers 24 denoted by reference numerals 24*a*, 24*b*, 24*c* corresponding respectively to a Commscope ION radio, Ericsson RRU radio, and a Commscope Prism radio.

The shroud 20 has a generally planar backbone 28 situated in the interior region of the housing of the shroud 20. The backbone 28 has a plurality of apertures 32, which are used to mount a plurality of different types of brackets 34 for holding the different types of cellular telephone equipment corresponding to different cellular telephone networks and carriers. Optionally, the backbone 28 (and/or apertures 32)

and the brackets 34 can be color coded so that a technician can easily determine where a particular bracket 34 should be installed on the backbone 28.

Although not limited to these construction materials, in the preferred embodiment, the doors 22a, 22b are manufactured from aluminum. The rear structure 25, the top panel 27a, the bottom panel 27b, and the door jamb 28 of the housing of the shroud 20 are made of powder coated carbon steel. The brackets 34 are also made of powder coated carbon steel.

The housing of the shroud 20 has numerous apertures 35 in the doors 22a, 22b, the top panel 27a, and the bottom panel 27b, to enable passage of air for heat dissipation. The top and bottom panels 27a, 27b have more apertures 35 than the doors 22a, 22b in order to create a chimney effect to encourage an upward air flow and resultant heat dissipation.

Figure 9:
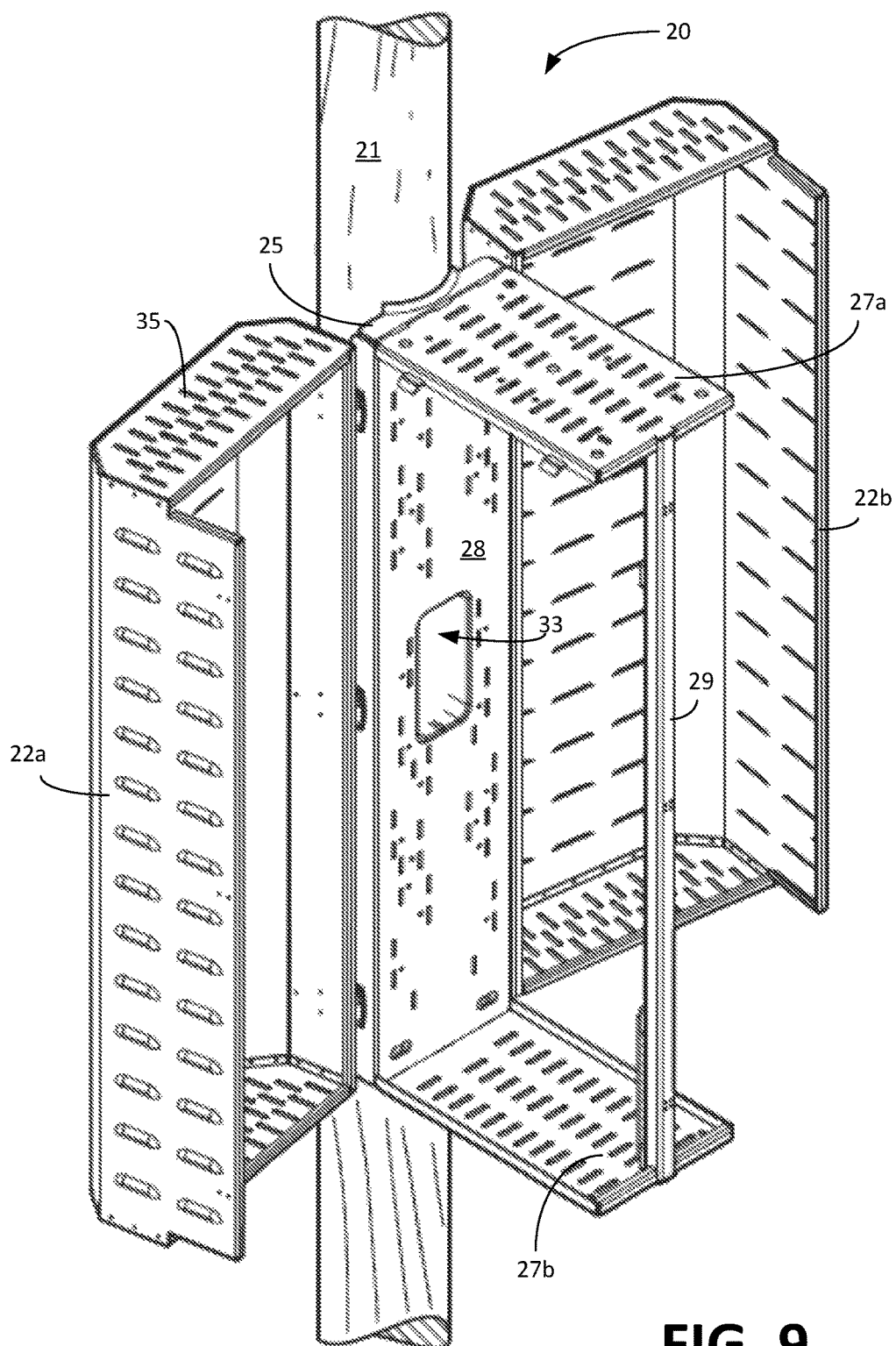
FIG. 9 is a left perspective view of the shroud in an open configuration without any radios mounted, showing a backbone into which radio support brackets are attached.
Figure 10:
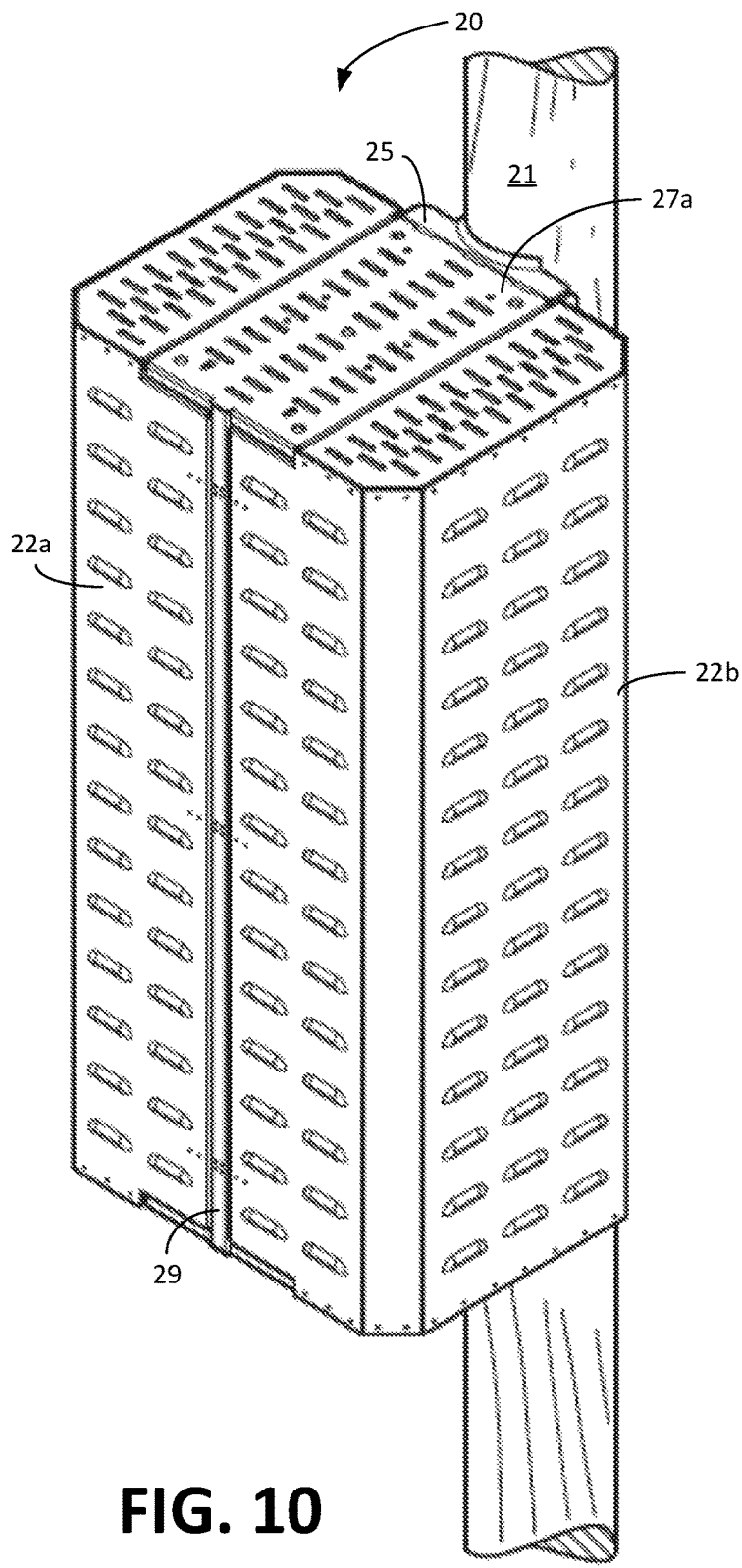
FIG. 10 is a right perspective view of the shroud in a closed configuration.

As shown in FIG. 9, the backbone 28 and rear structure 25 of the shroud 20 includes at least one hole 33 through which passes a cable that connects the antenna and the RF conditioning equipment 52 and an optical fiber that connects an optical network to the network interface 48.

Various examples of brackets 34 are illustrated in FIGS. 12 through 18. In general, each bracket 34 has a longitudinal body between a first end 44a and a second end 44b. Each bracket 34 is attachable and detachable to and from the backbone 28 at the first end 44a by insertion and removal, respectively, into and from one or more of the apertures 32. Each longitudinal body 42 has a means for attaching one or more cellular transceivers 24 to the body 42. The telephone equipment to be attached to the bracket typically includes a threaded or non-threaded stud, a stud with end cap, a threaded screw (or bolt) hole, etc., to enable its mounting to the bracket 34.

The preferred embodiment of each bracket 34 includes a generally planar longitudinal body 42 with a plurality of hooks 46 at the first end 44a. The hooks 46 are insertable in the apertures 32 of the backbone 28. The second end 44b remains unattached, or free. The preferred embodiment of the brackets 34 are easy to install and remove from the backbone 28.

Figure 12:
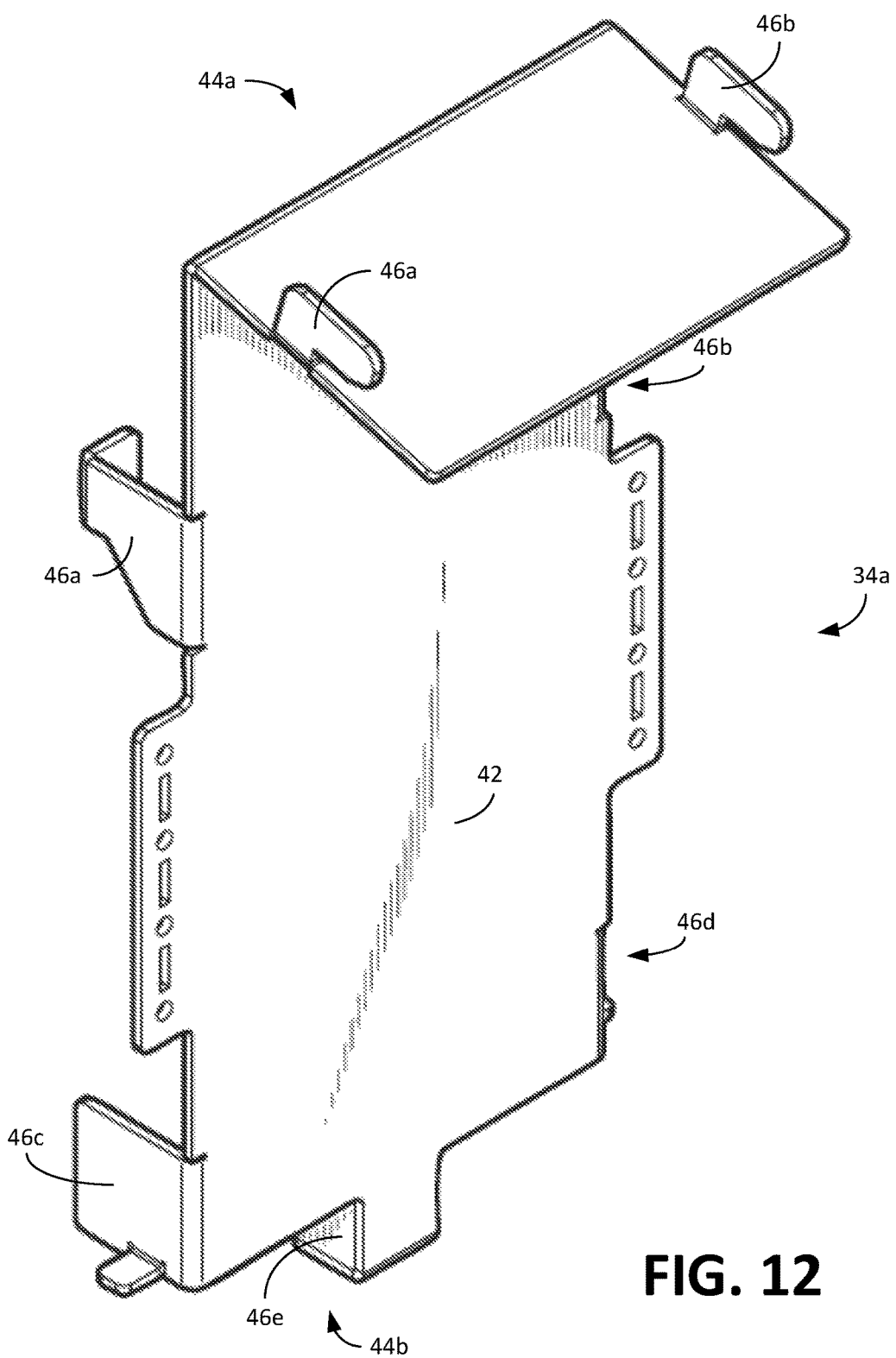
FIG. 12 is a perspective view of a first embodiment of a support bracket, which supports a network interface when inserted into the backbone.

FIG. 12 is a perspective view of a first embodiment of a support bracket 34a. The support bracket 34a is designed to support a commercially available network interface 48 (FIG. 3) when inserted into the backbone 28. In this example, the network interface 48 is a generally rectangular box that can be opened to access an optical fiber interface. In order to hold and safely secure the network interface 48, the bracket 34a has at its periphery upper lips 46a, 46b (not shown), at each side near the top, lower lips 46c, 46d (not shown), at each side near the bottom, and a bottom lip 46e.

Figure 13:
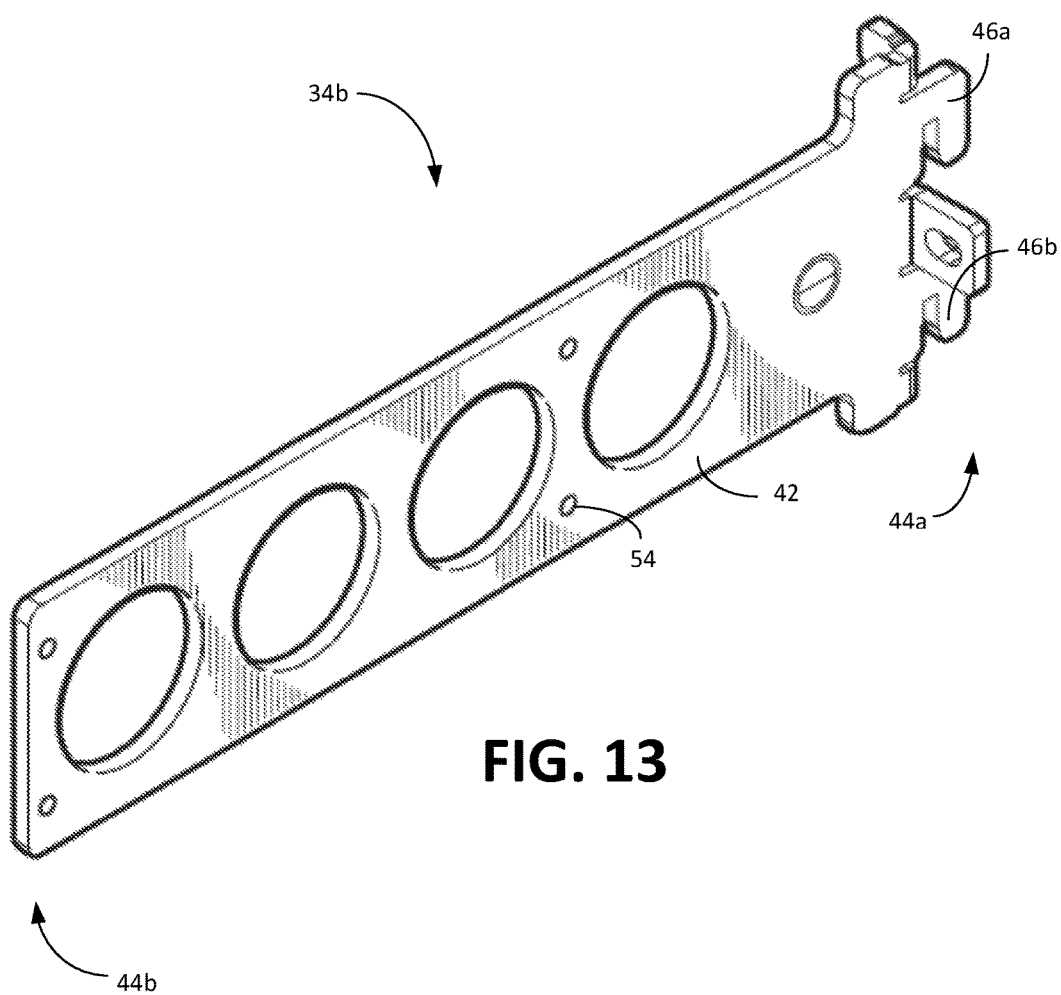
FIG. 13 is a perspective view of a second embodiment of a support bracket, which supports RF conditioning equipment when inserted into the backbone.

FIG. 13 is a perspective view of a second embodiment of a support bracket 34b, which supports commercially available RF conditioning equipment 52 (FIG. 3) when inserted into the backbone 28. The RF conditioning equipment 52 is attached to the bracket 34b with four threaded screws that pass through holes 54 in the bracket 34b and into respective threaded holes in the RF conditioning equipment 52. The large circular holes in the bracket 34b help reduce the weight of the bracket 34b.

Figure 14:
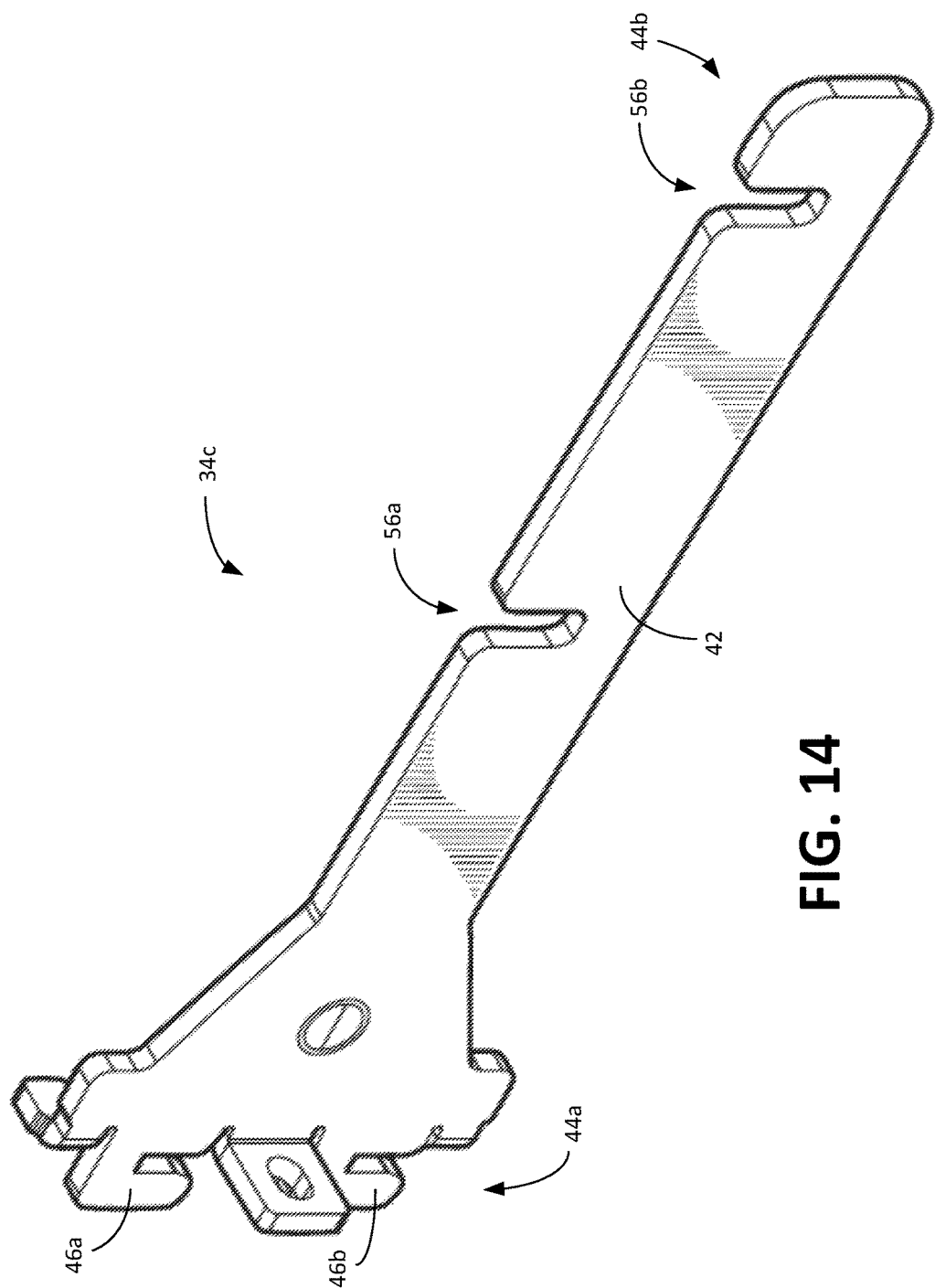
FIG. 14 is a perspective view of a third embodiment of a support bracket, which supports the Ericcson RRU radio when inserted into the backbone.

FIG. 14 is a perspective view of a third embodiment of a support bracket 34c, which supports the Ericcson RRU radio 24b (FIGS. 1, 2 4, 5, and 8) when inserted into the backbone 28. The Ericcson RRU radio 24b includes two studs (not shown) with circular enlarged end caps extending outwardly from its housing that slide into 56a, 56b (so that the end caps are on one side and the radio 24b is on the other side) in order to secure the radio 24b to the bracket 34c.

Figure 15:
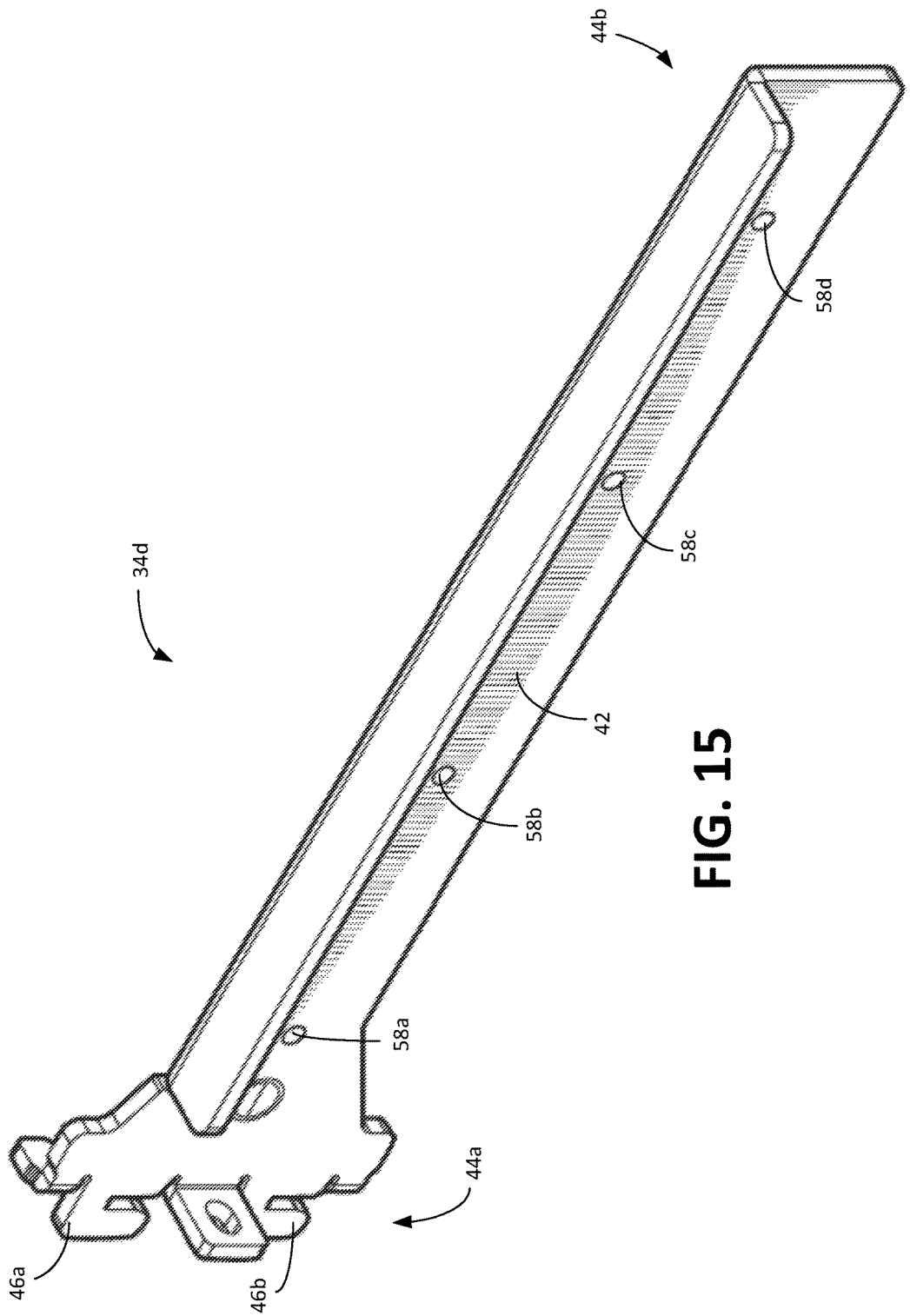
FIG. 15 is a perspective view of a fourth embodiment of a support bracket, which supports two Commscope ION radios when inserted into the backbone at the bottom.

FIG. 15 is a perspective view of a fourth embodiment of a support bracket 34c, which can support one or two Commscope ION radios 24a (FIGS. 1, 3, 5, and 7) when inserted into the backbone 28 at the bottom. Some of the Commscope ION radios 24a include threaded holes (not shown) to enable mounting to the bracket 34. Two Commscope ION radios 24a can be mounted side by side, each with two screws (or bolts) passing through two adjacent holes 58a-58d.

Figure 16:
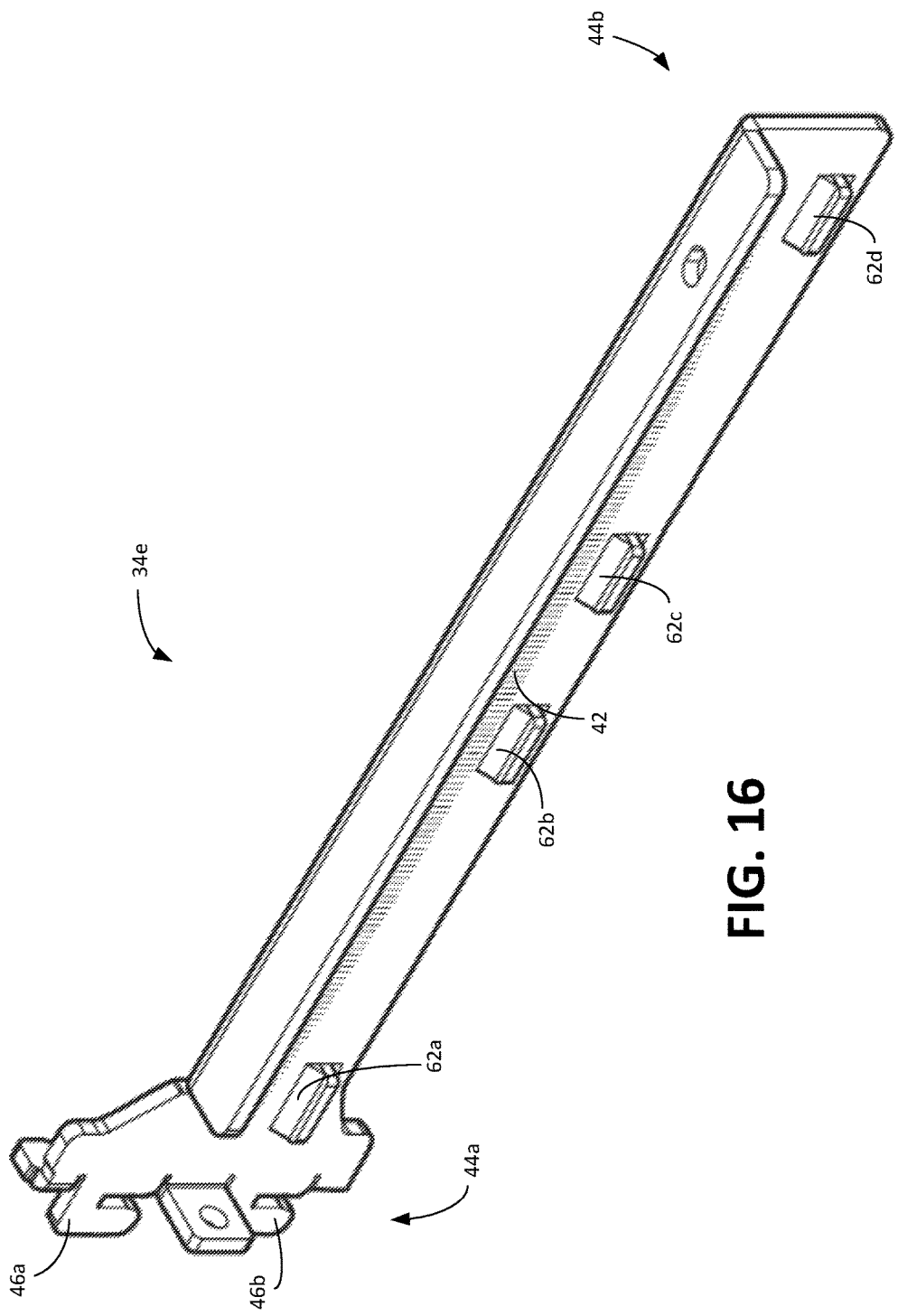
FIG. 16 is a perspective view of a fifth embodiment of a support bracket, which supports two Commscope ION radios when inserted into the backbone at the top.

FIG. 16 is a perspective view of a fifth embodiment of a support bracket 34e, which supports two Commscope ION radios when inserted into the backbone 28 at the top. Some of the Commscope ION radios 24a include rectangular apertures (not shown) to enable mounting to the support bracket 34e. Two Commscope ION radios 24a can be mounted side by side, each with two outwardly extending nubs 62a-62d.

Figure 17:
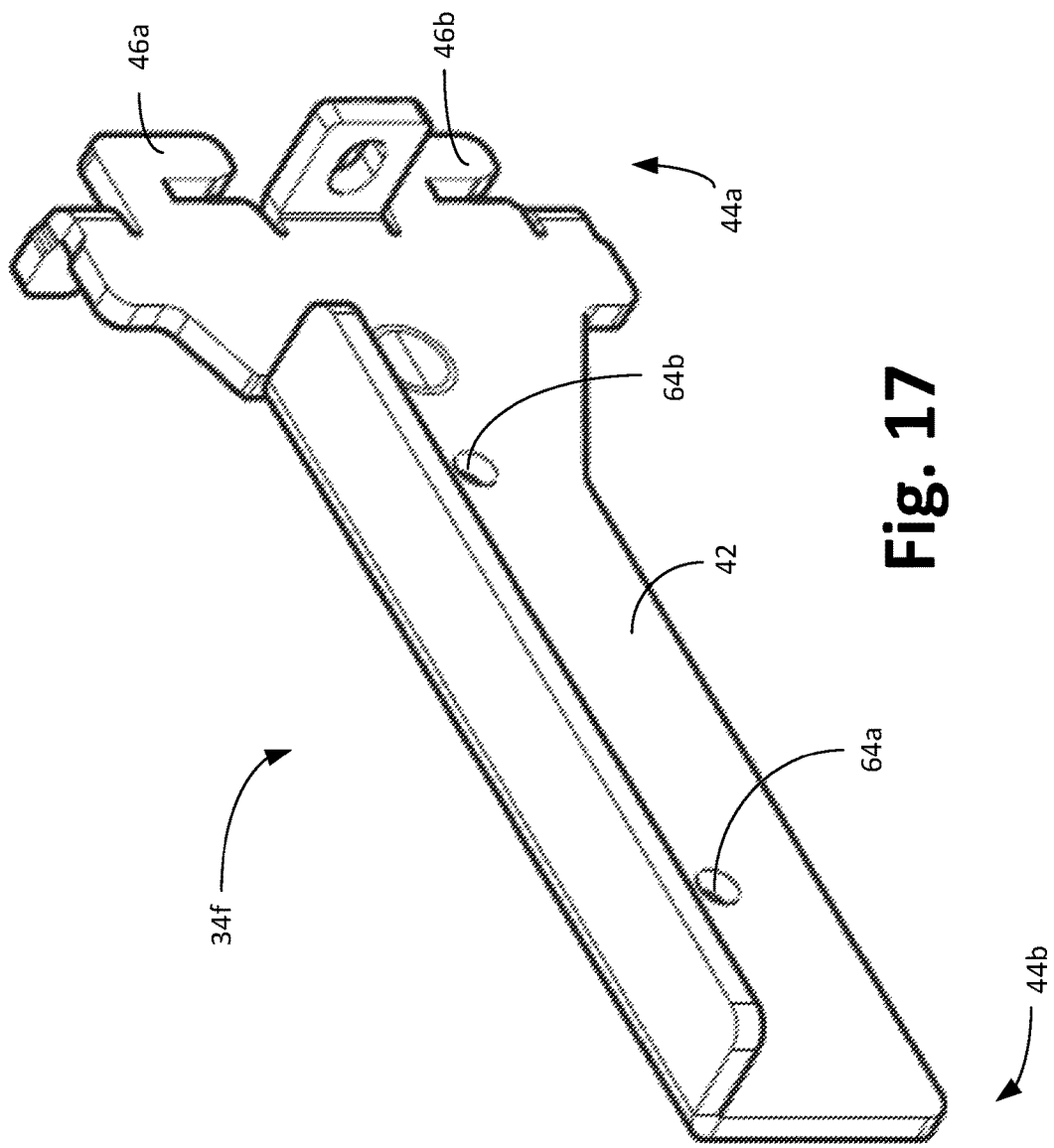
FIG. 17 is a perspective view of a sixth embodiment of a support bracket, which supports one Commscope ION radio when inserted into the backbone at the bottom.

FIG. 17 is a perspective view of a sixth embodiment of a support bracket 34f, which supports one Commscope ION radio when inserted into the backbone 28 at the bottom. The Commscope ION radio 24a is mounted with two screws (or bolts) passing through the two holes 64a, 64b and into the Commscope ION radio 24a.

Figure 18:
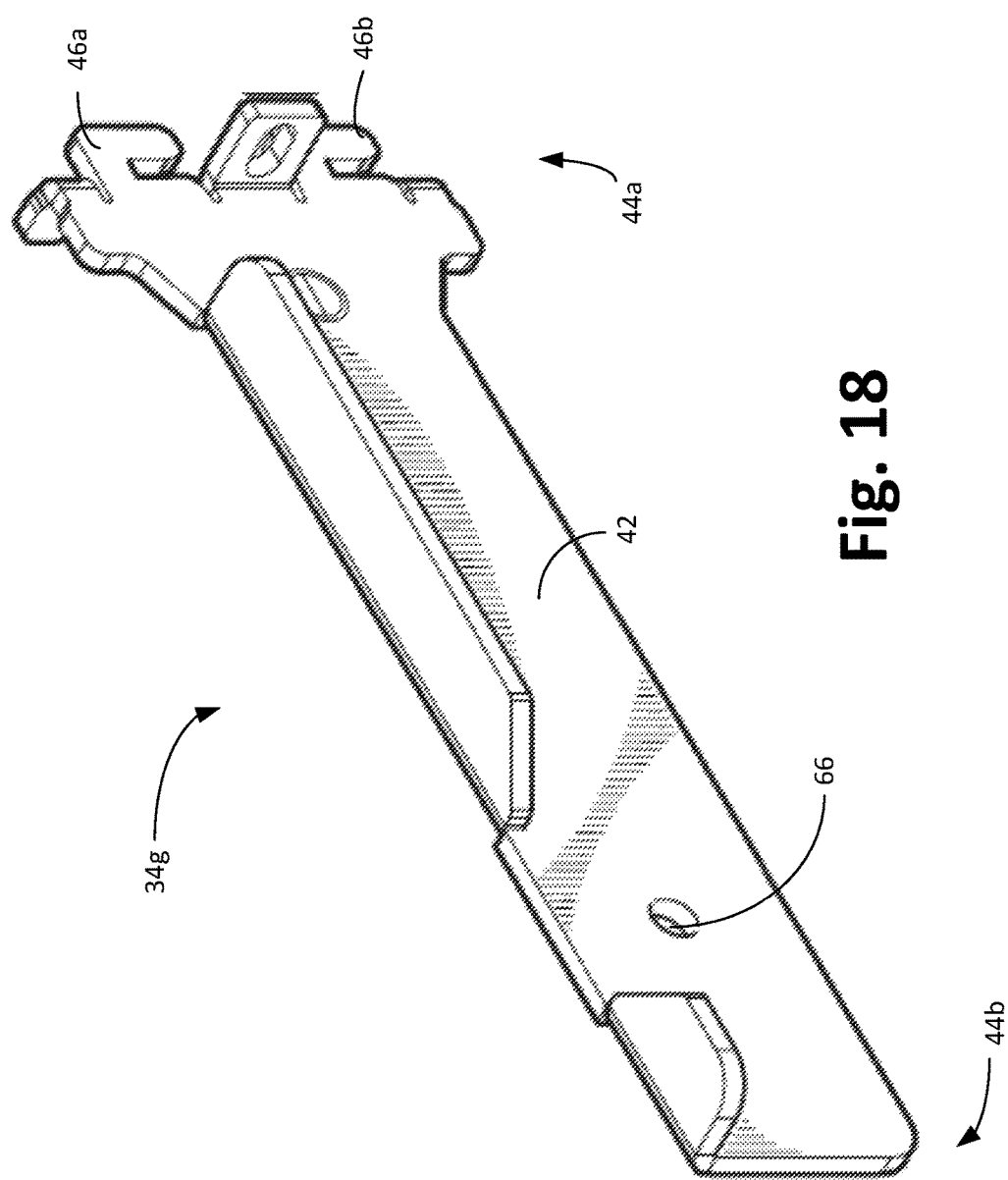
FIG. 18 is a perspective view of a seventh embodiment of a support bracket, which supports the Commscope Prism radio when inserted into the backbone.

FIG. 18 is a perspective view of a seventh embodiment of a support bracket 34g, two of which support the Commscope Prism radio 24c (FIGS. 1-4, 6) when inserted into the backbone 28. A first one of the support brackets 34g is situated at or near the top of the backbone 28 and a second one of the support backets 34g is situated at or near the bottom of the backbone 28, generally in vertical alignment with the first one. The Commscope Prism radio 24c typically has threaded holes to enable mounting. Screws (or bolts) are used to mount the radio 24c to the brackets 34g via the holes 66 in each.

The preferred embodiment of the shroud can have at least the following mounting options: (a) 4 Ericsson RRU Radios 24b with 2 multiplexers 52 and 1 network interface 48; (b) 4 Commscope ION radios 24a with 4 multiplexers 52, and 1 network interface 48; (c) 2 Commscope Prism radios 24c with 4 multiplexers 52 and 1 network interface 48; (d) 2 Ericsson RRU radios 24b and 2 Commscope ION radios 24a with 2 multiplexers 52 and 1 network interface 48; (e) 2 Ericsson RRU radios 24b and 1 Commscope Prism radio 24c with 2 multiplexers 52 and 1 network interface 48; (f) 2 Commscope ION radios 24a and 1 Commscope Prism radio 24c with 4 multiplexers 52 and 1 network interface 48; (g) 1 Ericsson RRU radio 24b, 1 Commscope ION radio 24a, and 1 Commscope Prism radio 24c with 3 multiplexers 52 and 1 network interface 48; and (h) 2 Ericcson RRU radios 24b, 2 Commscope ION radios 24a, and 1 Commscope Prism radio 24c with 2 multiplexers 52 and 1 network interface 48.

Figure 1:
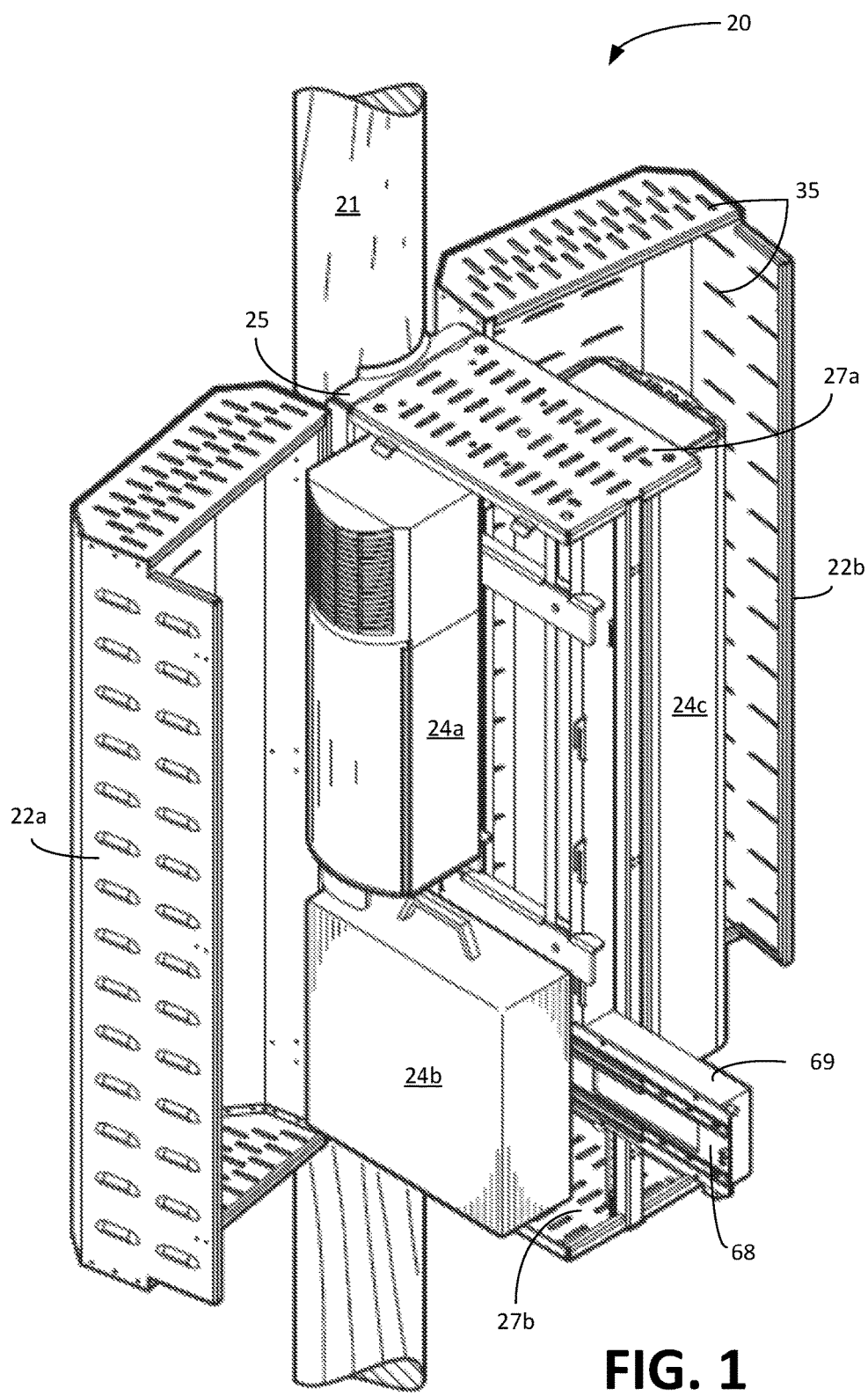
FIG. 1 is a left side perspective view of a first embodiment of a shroud of the present disclosure wherein the shroud is in an open configuration showing a Commscope ION radio (at upper left from a vantage point directly in front of the shroud), an Ericcson RRU radio (at lower left), and a Commscope Prism radio (at right) mounted within the shroud.
Figure 2:
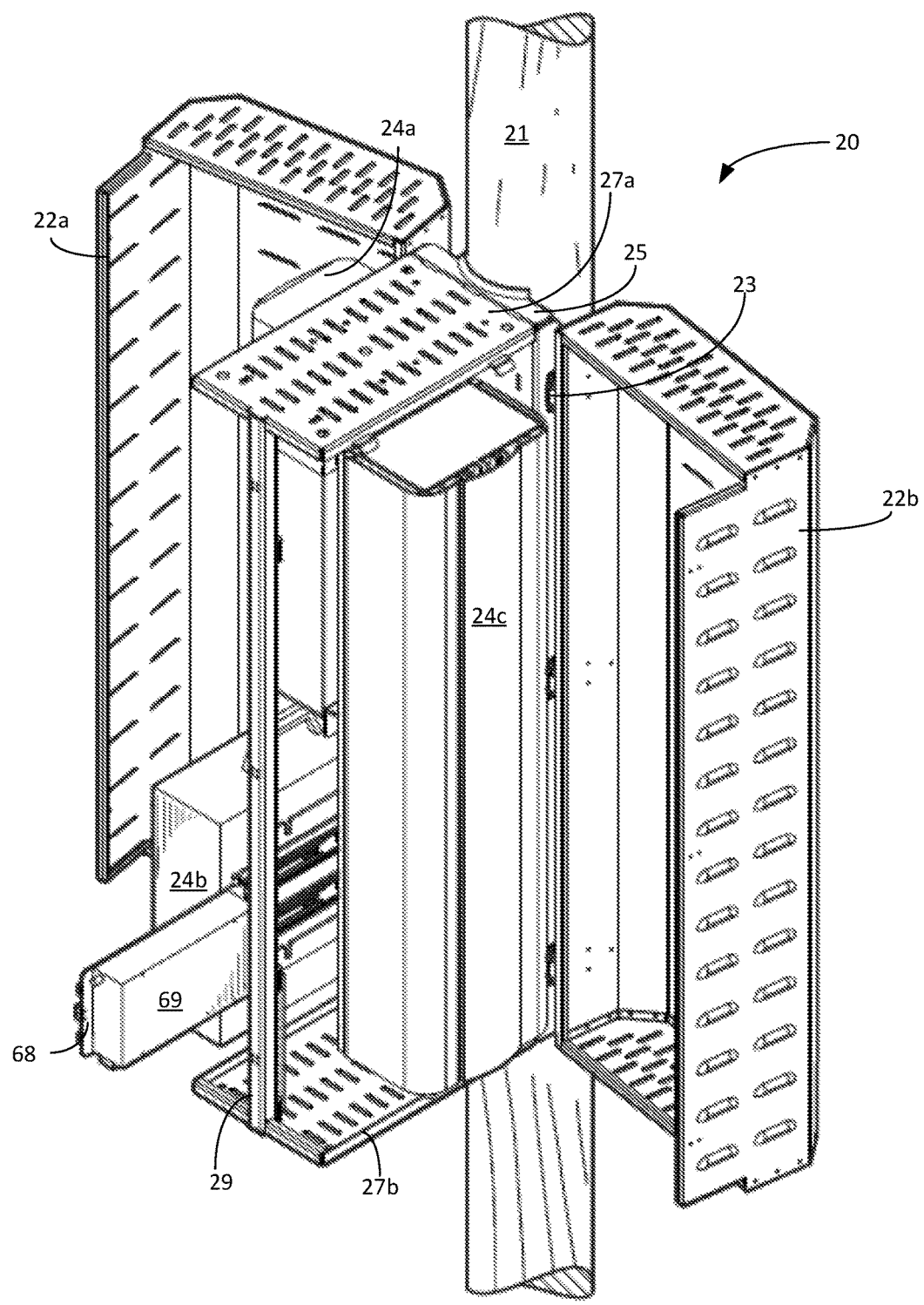
FIG. 2 is a right side perspective view of the open shroud with contents of FIG. 1.
Figure 3:
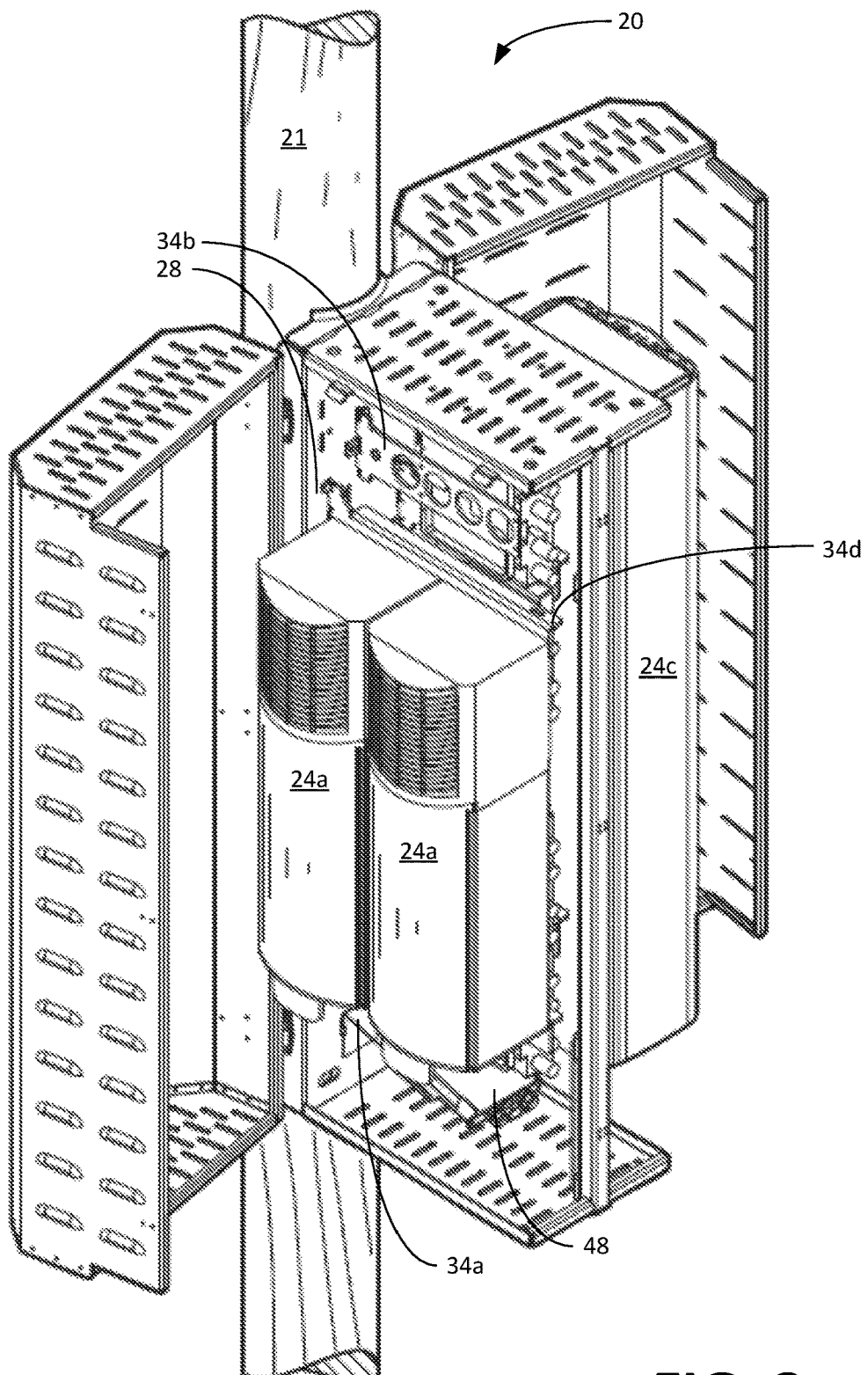
FIG. 3 is a left side perspective view of a second embodiment of the shroud wherein the shroud is in an open configuration showing two Commscope ION radios (at left) and a Commscope Prism radio (at right) mounted within the shroud.
Figure 4:
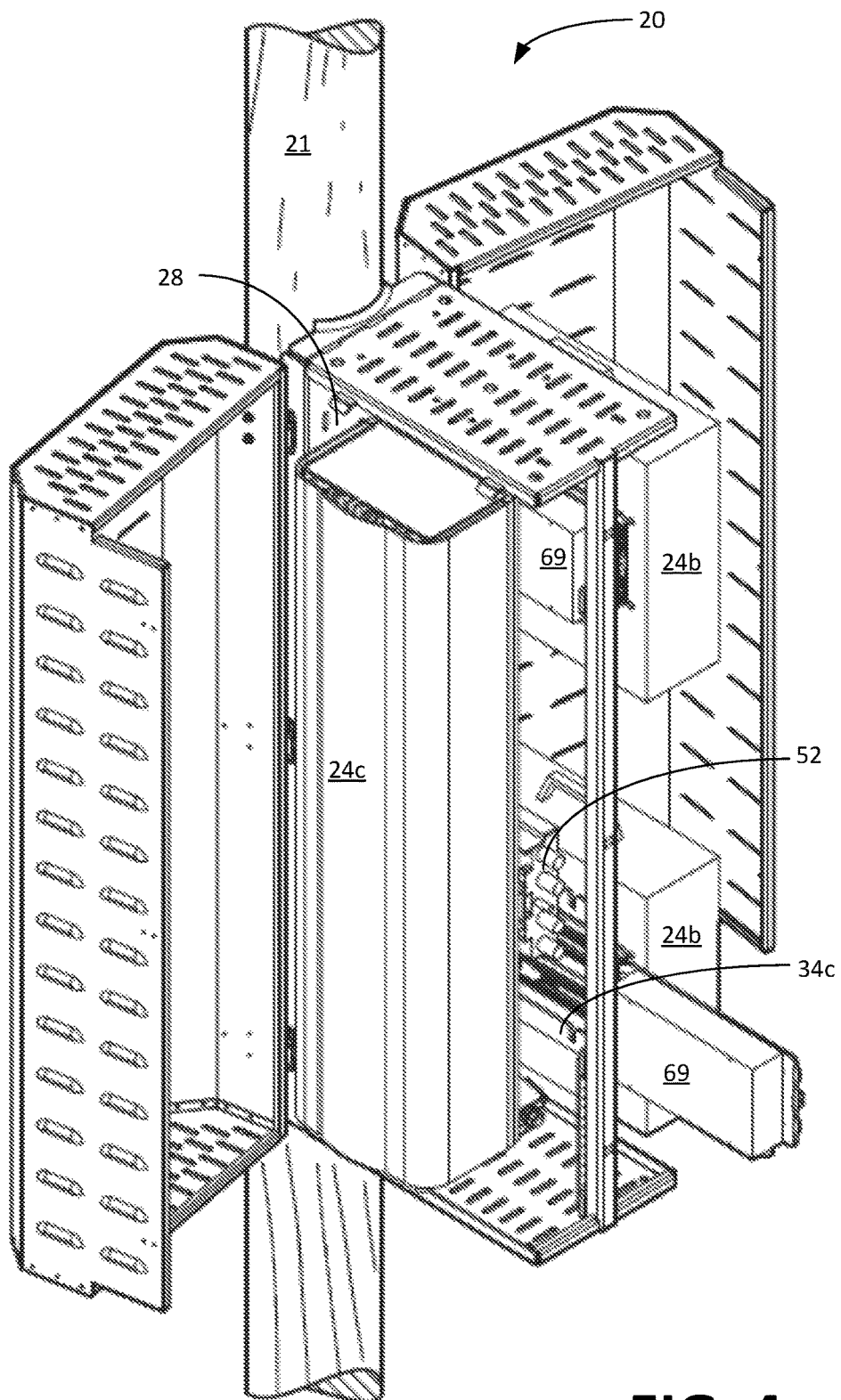
FIG. 4 is a left side perspective view of a third embodiment of the shroud wherein the shroud is in an open configuration showing a Commscope Prism radio (at left) and two Ericcson RRU radios (at right) mounted within the shroud.
Figure 5:
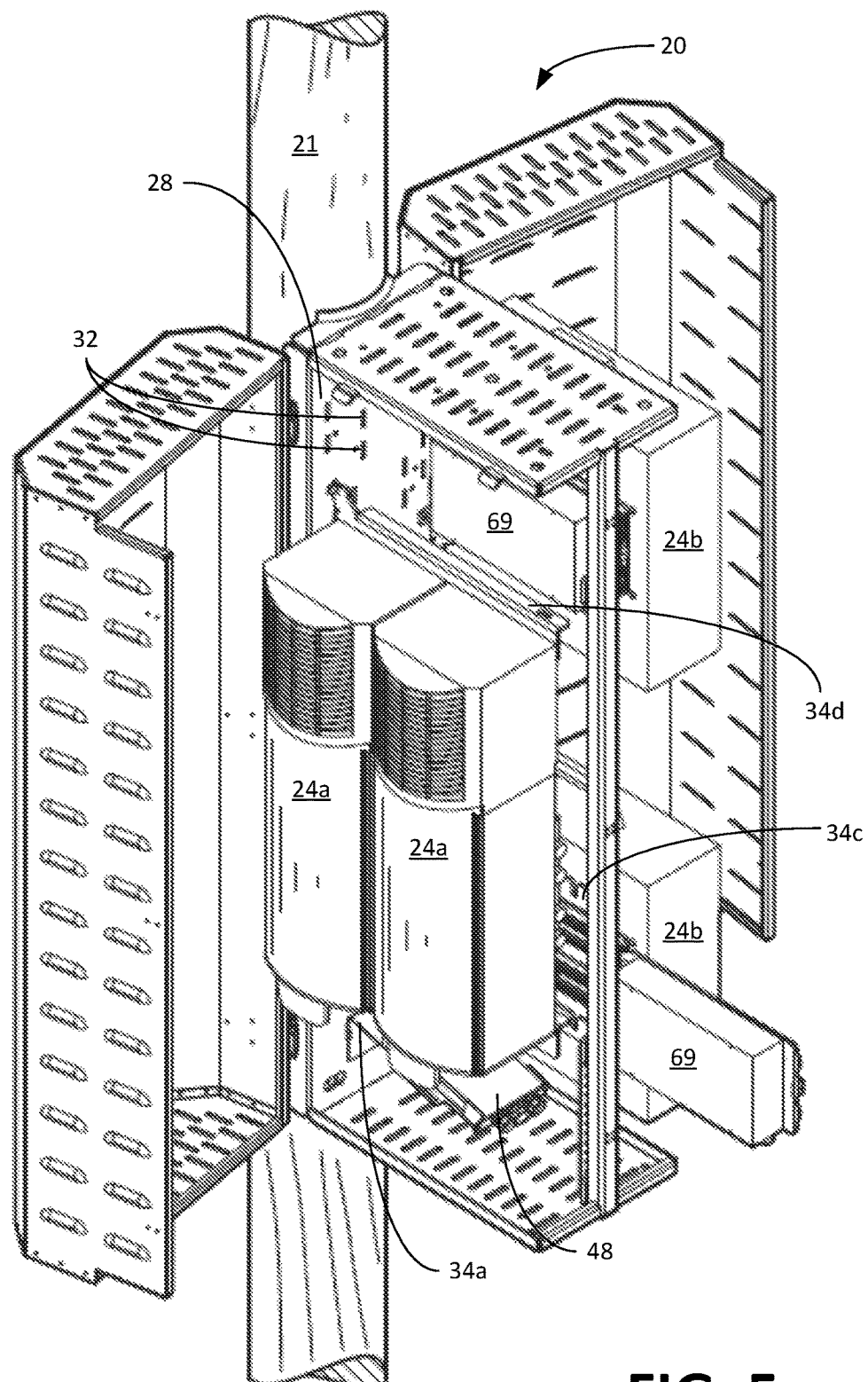
FIG. 5 is a left side perspective view of a fourth embodiment of the shroud wherein the shroud is in an open configuration showing two Commscope ION radios (at left) two Ericcson RRU radios (at right) and mounted within the shroud.
Figure 6:
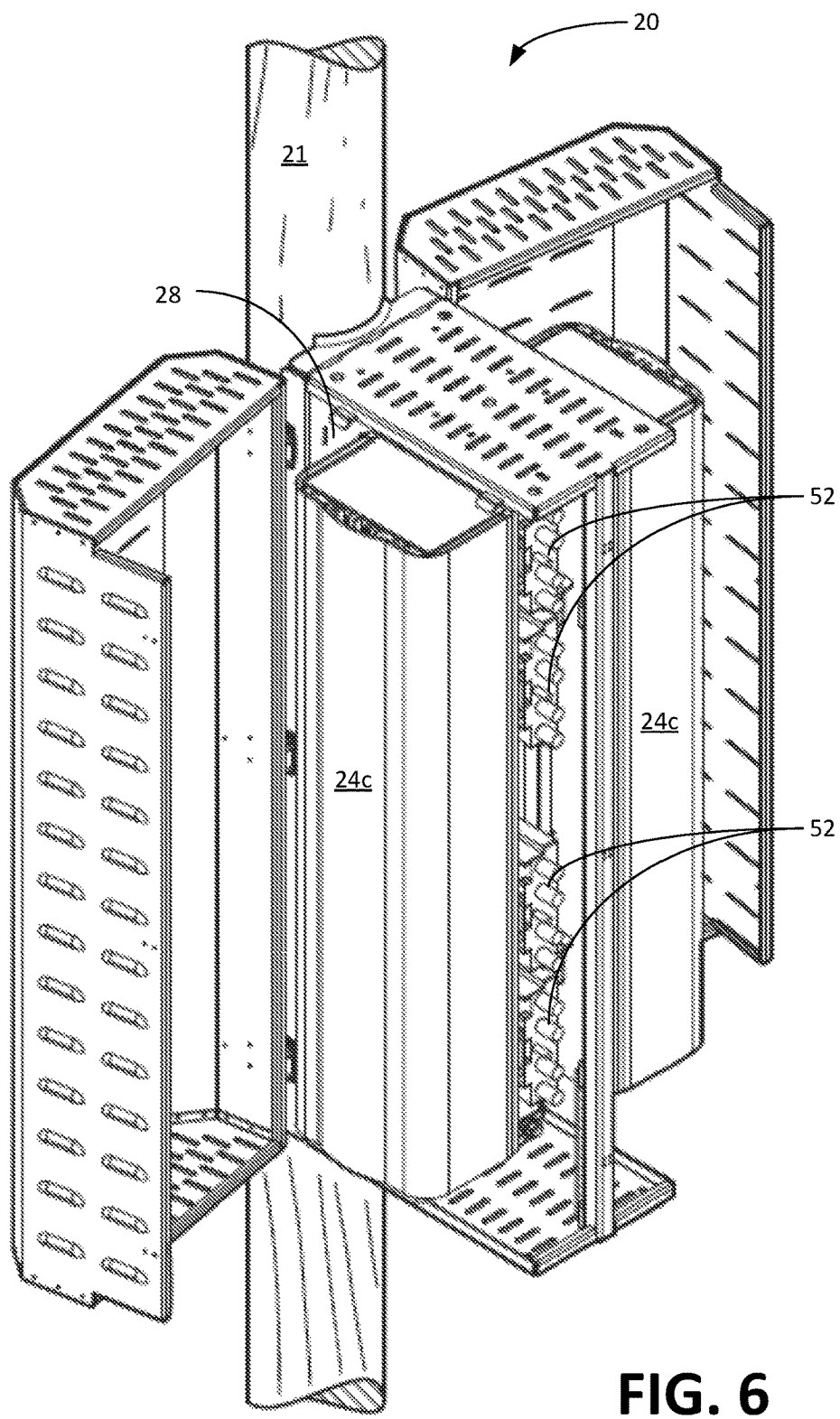
FIG. 6 is a left side perspective view of a fifth embodiment of the shroud wherein the shroud is in an open configuration showing one Commscope Prism radio (at left) and one Commscope Prism radio (at right) mounted in the shroud.
Figure 7:
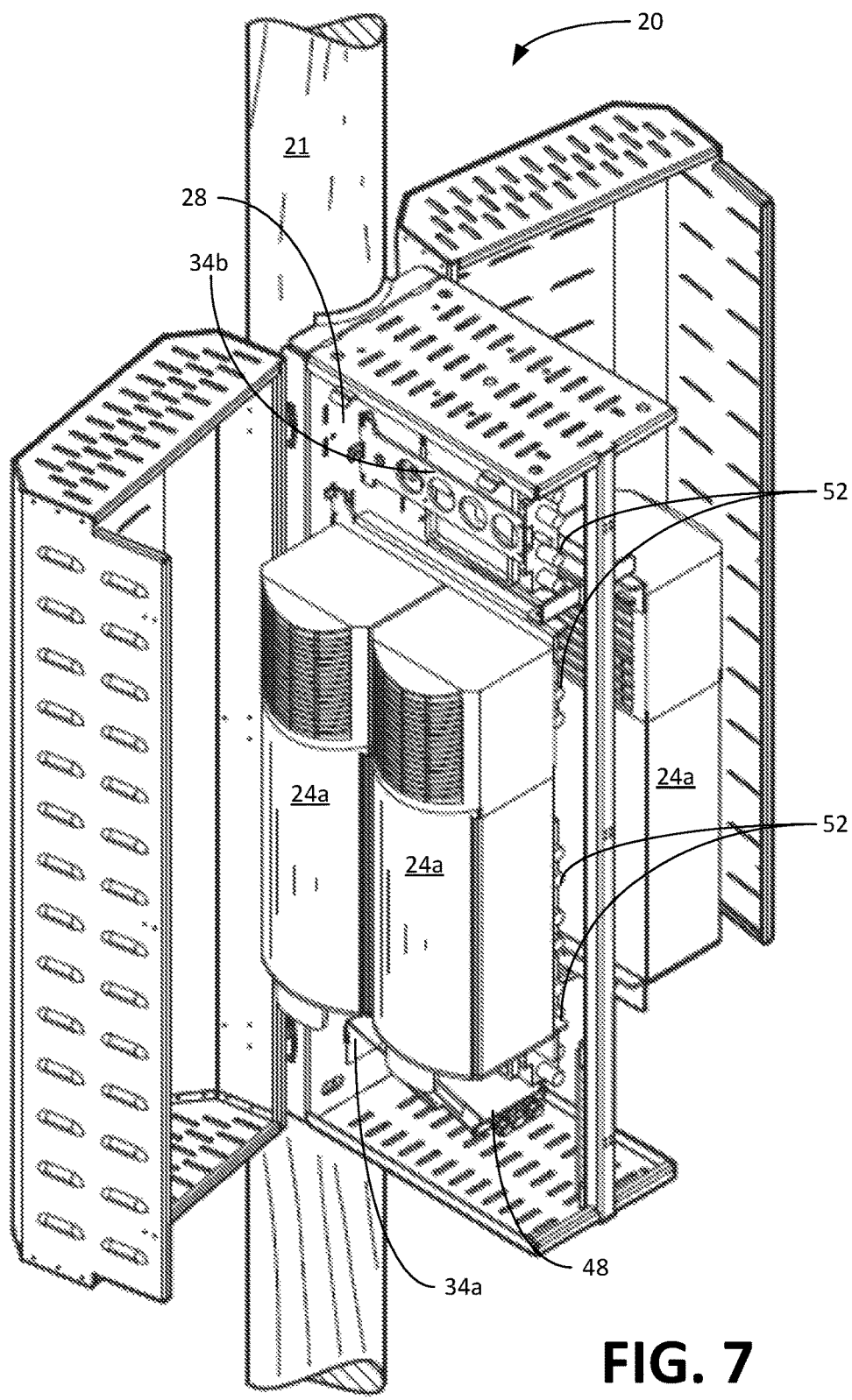
FIG. 7 is a left side perspective view of a sixth embodiment of the shroud wherein the shroud is in an open configuration showing two Commscope ION radios (at left) and two Commscope ION radios (at right) mounted within the shroud.
Figure 8:
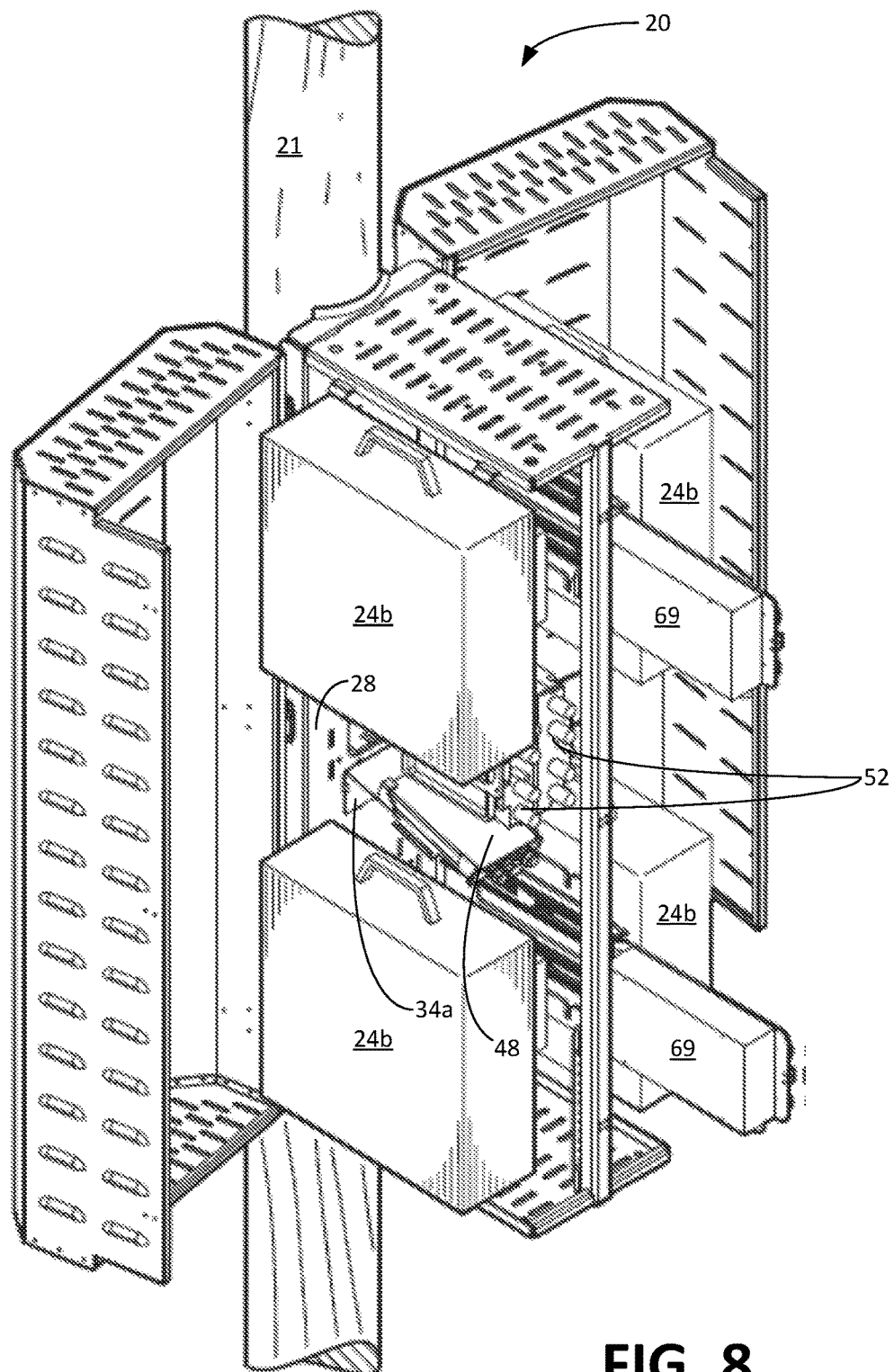
FIG. 8 is a left side perspective view of a seventh embodiment of the shroud wherein the shroud is in an open configuration showing two Ericcson RRU radios (at left) and two Ericcson RRU radios (at right) mounted within the shroud.

With reference to FIG. 1, there is also a slide rail 68 that mounts on the back of the Ericsson RRU Radio 24b to hold the power supply unit (PSU) 69 that can be pulled out when the PSU 69 goes bad. This feature allows the site to remain powered up while only the bad radio is off line. The technician can pull the PSU 69 out, disconnect three wires, and remove 4 small bolts holding the PSU 69 to the slide. The new PSU 69 can be mounted on site, the wires reconnected, and the new PSU 69 slid back into place. This feature advantageously eliminates the need for the technician to remove the entire Ericsson RRU radio 24b and all the cables hooked to it.

Variations and Modifications

It should be emphasized that the above-described embodiment(s) of the present invention, preferably any "preferred embodiment(s), are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present.

As an example of a variation, the brackets 34 could be designed with a rearwardly extending, threaded or unthreaded stud that is received by a corresponding hole in the backbone 28.

As another example of a variation, the housing 20 can be designed to have a single hinged door that moves sideways.

At least the following is claimed:

1. A shroud for housing cellular telephone equipment, the shroud comprising:
   a housing, the housing having walls that define an interior region, the housing having at least one movable door that can be opened and closed to respectively permit and prevent access to the interior region;
   a generally planar backbone situated in the interior region, the backbone having a plurality of apertures;
   a plurality of elongated brackets, each bracket having a longitudinal body between an attached end and an unattached free end, the attached end having a plurality of hooks, each bracket attached to the backbone at the attached end by insertion of the hooks into the apertures of the backbone, each longitudinal body having a means for attaching a cellular transceiver;
   radio frequency (RF) conditioning equipment mounted on a first one of the brackets within the housing;
   a network interface mounted on a second one of the brackets within the housing; and
   first and second transceivers mounted on one or more others of the brackets within the housing, the first and second transceivers being of a different type and capable of operation over different cellular networks.

2. The shroud of claim 1, wherein the housing comprises:
   a rear structure;
   a top panel;
   a bottom panel; and
   left and right side doors attached via respective hinges to the rear structure and that open and close in opposing sideway direction to open and close the housing.

3. The shroud of claim 2, wherein the top panel, the bottom panel, and the doors have openings to permit entry and exit of air and wherein the top panel and bottom panel each have more of the openings than the doors so that a chimney effect is achieved, resulting in vertical air flow through the housing and enhanced heat dissipation.

4. A shroud for housing cellular telephone equipment, comprising:
   a housing, the housing having walls that define an interior region, the housing having at least one movable door that can be opened and closed to respectively permit and prevent access to the interior region;
   a generally planar backbone situated in the interior region, the backbone having a plurality of apertures; and
   a plurality of elongated brackets, each bracket having a longitudinal body between a first end and a second end, each bracket attached to the backbone at the first end by insertion into one of the apertures, each longitudinal body having a means for attaching a cellular transceiver.

5. The shroud of claim 4, wherein the first end comprises a plurality of hooks that hook into apertures associated with the backbone.

6. The shroud of claim 5, wherein the second end is unattached.

7. The shroud of claim 4, further comprising a plurality of cellular transceivers and wherein the plurality includes first and second transceivers that are different.

8. The shroud of claim 4, wherein the housing comprises:
   a rear structure;
   a top panel;
   a bottom panel; and
   left and right side doors attached via respective hinges to the rear structure and that open and close in an opposing sideway direction to open and close the housing.

9. The shroud of claim 8, wherein the top panel, the bottom panel, and the doors have openings to permit entry and exit of air and wherein the top panel and bottom panel each have more of the openings than the doors so that a chimney effect is achieved, resulting in vertical air flow through the housing and enhanced heat dissipation.

10. The shroud of claim 4, further comprising radio frequency (RF) conditioning equipment situated in one of the brackets, and a network interface situated on another of the brackets, and wherein the backbone further comprises a hole through which passes a cable that connects an external antenna and the RF conditioning equipment and an optical fiber that connects an optical network to the network interface.

11. The shroud of claim 4, further comprising a slide rail mounted to the first transceiver and a power supply for the first transceiver mounted to the slide rail and capable of being moved outwardly and inwardly on the slide rail to enable access to the power supply.

12. A shroud for housing cellular telephone equipment, the shroud comprising:
   a housing, the housing having walls that define an interior region, the housing having a door that can be opened and closed to respectively permit and prevent access to the interior region;
   means for mounting a first cellular transceiver within the interior region of the housing;
   means for mounting a second cellular transceiver within the interior region of the housing;
   wherein the first and second cellular transceivers are different in that each operates over a different cellular network; and
   wherein the means for mounting the first and second cellular transceivers comprises:
      a generally planar backbone situated in the interior region, the backbone having a plurality of apertures; and
      one or more elongated brackets, each bracket having a longitudinal body between an attached end and an unattached free end, the attached end having a plurality of hooks, each bracket attached to the backbone at the attached end by insertion of the hooks into the apertures of the backbone, each longitudinal body having a means for attaching a cellular transceiver.

13. The shroud of claim 12, further comprising radio frequency (RF) conditioning equipment mounted on one of the brackets within the housing and a network interface mounted on another one of the brackets within the housing.

14. A shroud for housing cellular telephone equipment, the shroud comprising:

a housing, the housing having walls that define an interior region, the housing having a door that can be opened and closed to respectively permit and prevent access to the interior region;
means for mounting a first cellular transceiver within the interior region of the housing;
means for mounting a second cellular transceiver within the interior region of the housing;
wherein the first and second cellular transceivers are different in that each operates over a different cellular network; and
wherein the housing comprises:
  a rear structure;
  a top panel;
  a bottom panel; and
  left and right side doors attached via respective hinges to the rear structure and that open and close in an opposing sideway direction to open and close the housing.

15. The shroud of claim 14, wherein the top panel, the bottom panel, and the doors have openings to permit entry and exit of air and wherein the top panel and bottom panel each have more of the openings than the doors so that a chimney effect is achieved, resulting in vertical air flow through the housing and enhanced heat dissipation.

16. A shroud for housing cellular telephone equipment, the shroud comprising:
  a housing, the housing having walls that define an interior region, the housing having a door that can be opened and closed to respectively permit and prevent access to the interior region;
  means for mounting a first cellular transceiver within the interior region of the housing;
  means for mounting a second cellular transceiver within the interior region of the housing;
  wherein the first and second cellular transceivers are different in that each operates over a different cellular network; and
  a slide rail mounted to the first transceiver and a power supply for the first transceiver mounted to the slide rail and capable of being moved outwardly and inwardly on the slide rail to enable access to the power supply.

* * * * *